United States Patent [19]

Rajendran et al.

[11] Patent Number: 4,944,782
[45] Date of Patent: Jul. 31, 1990

[54] BAFFLE TYPE HOOD AND DUCT FILTERS FOR COMMERICAL USE

[75] Inventors: Narayanan Rajendran, Melrose Park; Karl G. Otzen, Barrington, both of Ill.

[73] Assignee: S. C. Johnson & Son, Inc., Racine, Wis.

[21] Appl. No.: 308,957

[22] Filed: Feb. 6, 1989

Related U.S. Application Data

[63] Continuation of Ser. No. 360,367, Mar. 22, 1982, abandoned.

[51] Int. Cl.$^5$ .............................................. B01D 45/00
[52] U.S. Cl. ...................................... 55/444; 55/446; 55/464; 55/465; 55/DIG. 36
[58] Field of Search ................. 55/444, 446, 443, 464, 55/465, DIG. 36; 126/299 C, 299 D, 299 S

[56] References Cited

U.S. PATENT DOCUMENTS

| | | | |
|---|---|---|---|
| 1,400,860 | 12/1921 | Brown | 55/444 X |
| 3,530,649 | 9/1970 | Porsch et al. | 55/465 X |
| 3,566,585 | 3/1971 | Voloshen et al. | 55/DIG. 36 X |
| 3,813,856 | 6/1974 | Jensen | 55/444 |
| 3,870,494 | 3/1975 | Doane | 55/DIG. 36 X |
| 3,910,782 | 10/1975 | Struble et al. | 55/444 |
| 3,955,949 | 5/1976 | Rohrer | 55/444 |

FOREIGN PATENT DOCUMENTS

| | | | |
|---|---|---|---|
| 39335 | 10/1909 | Austria | 55/443 |

OTHER PUBLICATIONS

"Kleen-Gard Grease Filters", Form No. GF 1897, Research Products Corp., Madison Wisconsin, 10-78, Copy in 55-DIG. 36.

Primary Examiner—Charles Hart

[57] ABSTRACT

A disposable range hood filter and flame arrester having front and rear surfaces spaced closely apart from each other and connected to each other by flanges extending between them. Both front and rear surfaces comprise a plurality of spaced apart panels extending between the sides with each panel having a center offset panel portion lying inwardly of the body in relation to the remainder of the panel, so as to afford a depressed center section. A lower portion of each panel includes an aperture for permitting grease collection on the depressed center panel portion to drain into a bottom part of the filter body. The front and rear panels are laterally offset from each other so as to provide a labyrinthne path for air passing from the front to the rear of the filter unit. Preferably the units are made from a thin metal and are one inch or less in thickness. In the preferred form at least two ends or edges of the filter are defined in part by pockets which contain removable bars of like weight-imparting members to add mass to the filter and to stiffen it against bending. The filter/flame arrester unit are adapted to be discarded after use, or recycled, or cleaned at a remote location.

22 Claims, 4 Drawing Sheets

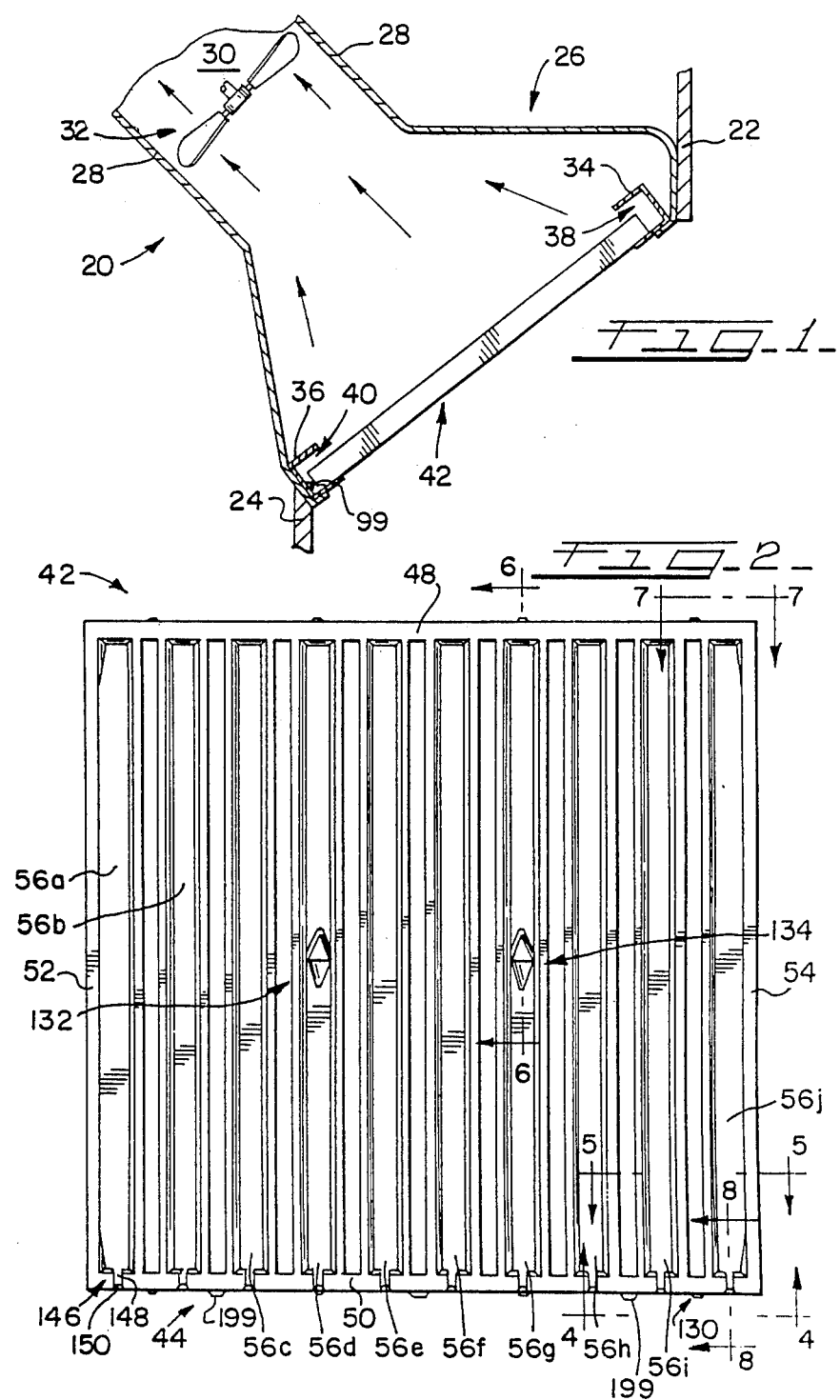

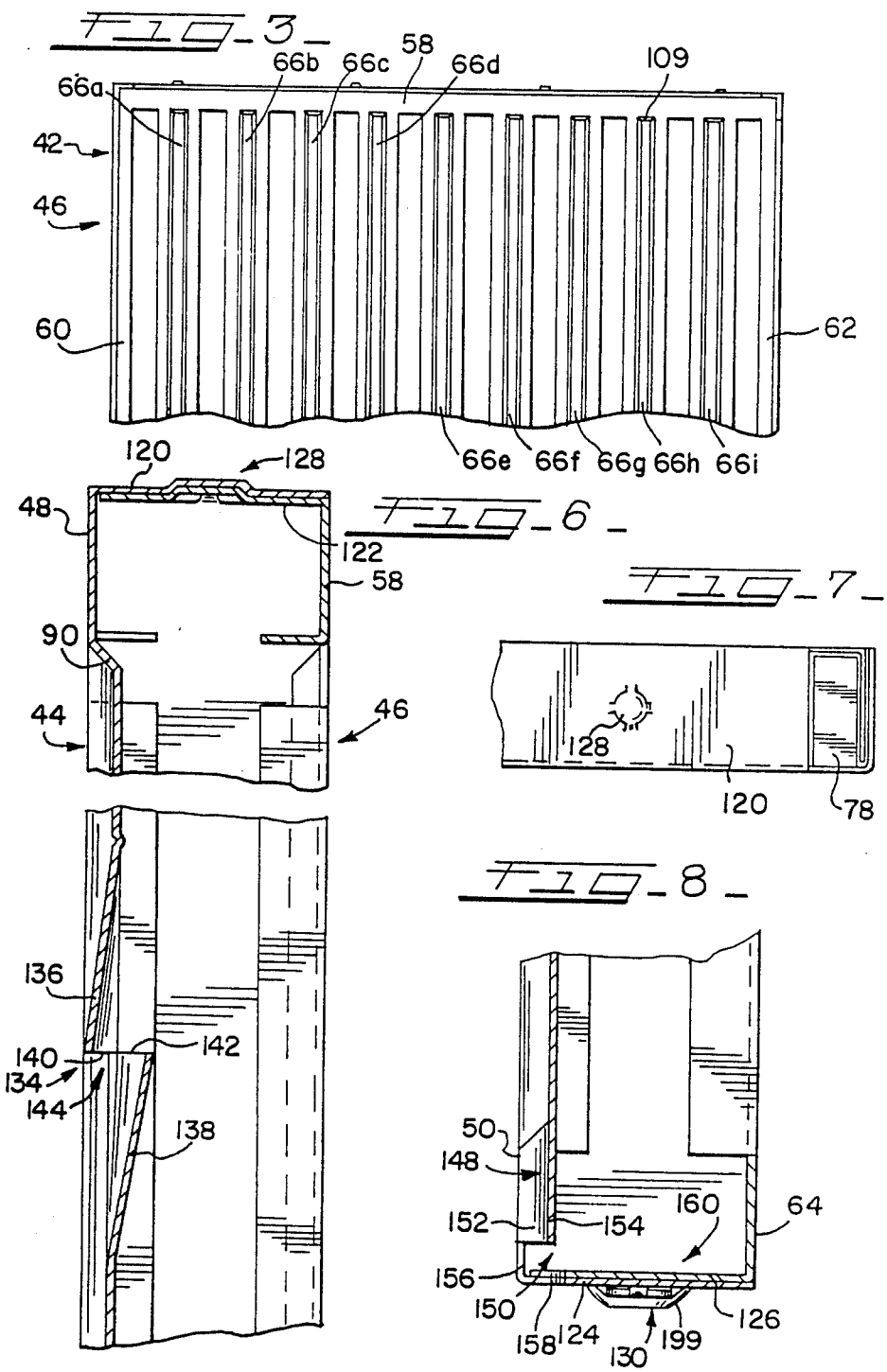

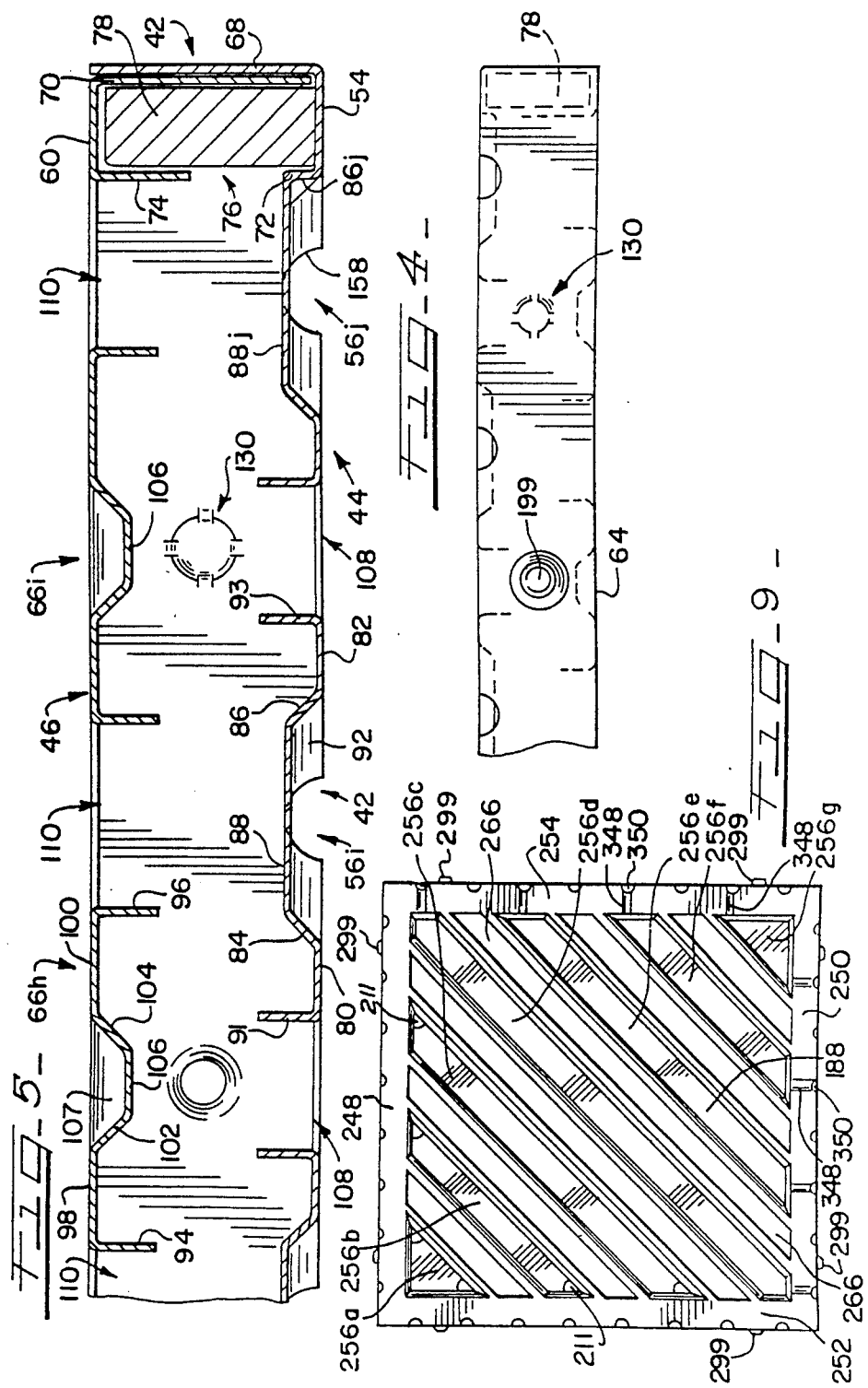

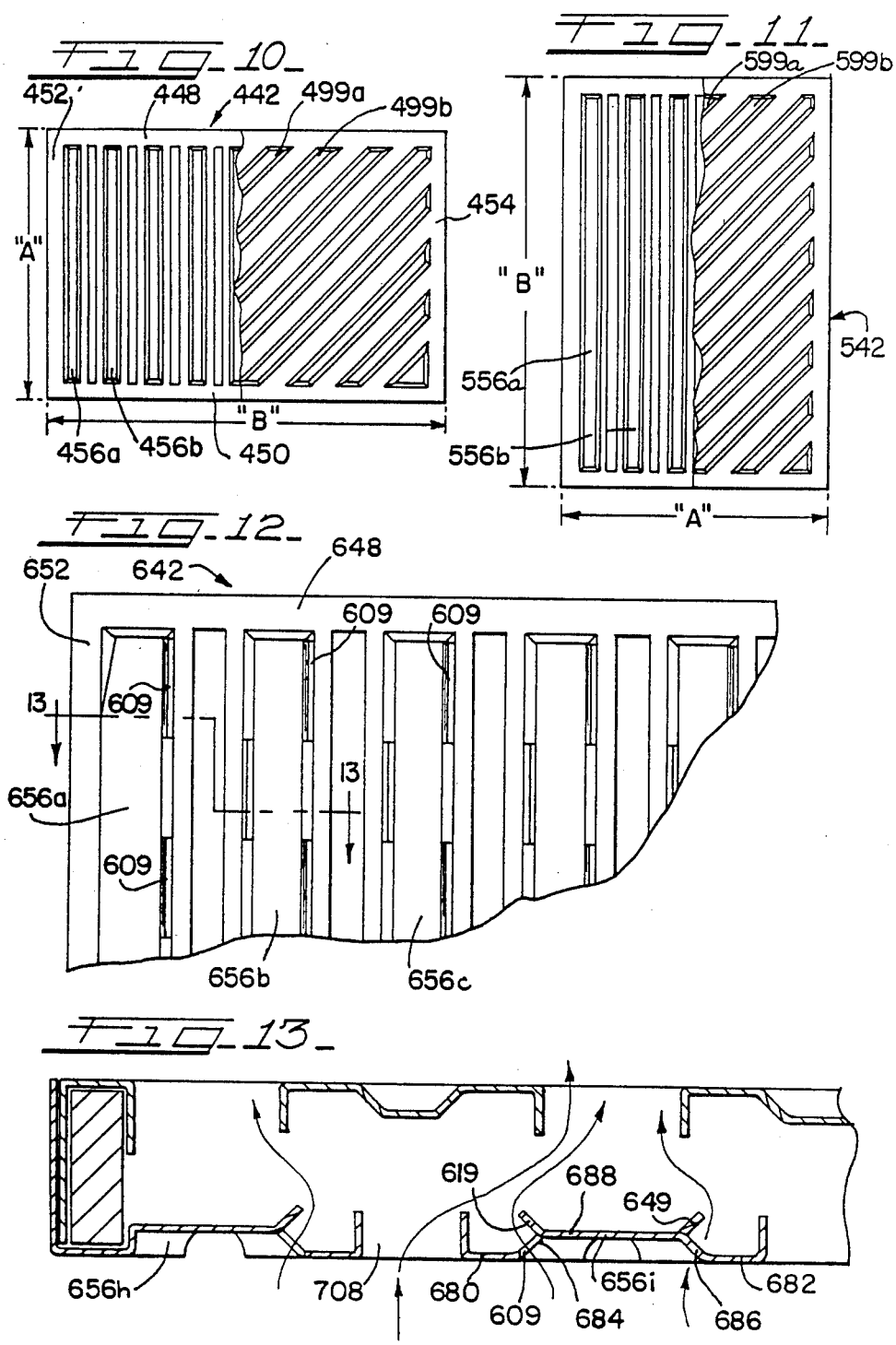

BAFFLE TYPE HOOD AND DUCT FILTERS FOR COMMERICAL USE

This application is a continuation of application Ser. No. 360,367 filed Mar. 22, 1982, now abandoned.

The present invention relates generally to restaurant filters and flame aresters, and in particular, to an improved combination so-called filter and flame arrester having utility in restaurant hoods, ducts and the like.

According to the invention, the filters are adapted to remove what is generally referred to as grease from the range hood of a restaurant, or other cooking establishment, and to control certain conditions prevailing in the vicinity of ranges, deep fat fryers, and other cooking apparatus and the effluent air stream into the atmosphere. As is well known, range cooking, including deep fat frying, creates complex aersol mixtures which are entrained in an air stream which is taken through one or more ducts from an interior of the structure in question to the exterior thereof. This airstream is not only in some cases flammable in itself, but is also rich in contaminants which, when deposited in the hood and duct areas of a building, create serious fire hazards.

Particularly when frying, for example, animal and/or vegetal fats are combined with water under high temperature conditions. This creates a combination of smoke or other aerosol, namely, a very finely dispersed and subdivided mixture of solid, liquid and semi-solid particles in the air stream. The air stream in which these particles are disposed is collected through an exhaust fan or the like, and the entire mass of contaminated air is continuously drawn through so-called hood or duct filters, and is then discharged to the outside atmosphere. The present invention is directed to problems which occur in the treatment of this air stream.

There are safety requirements prevailing in the restaurant industry, for example, which provide that, in the event of a fire in a hood assembly, propogation of the flame downstream of the grease collector/filter assembly should be limited to a certain length. The various government and/or insurance rating agencies provide codes and other standards by which such undesirable flame propogation may be measured.

For example, the National Fire Protection Agency (NFPA) has codes applicable to kitchens which relate to the amount of flame propogation which is permissible downstream of a filter assembly under standard conditions. Underwriters Laboratories and other private organizations using these or other criteria, set forth standards and conduct tests for compliance with such standards. Such criteria or standards include, but are not limited to, standard NFPA 96, relating to vapor removal from cooking equipment published in 1978 by the National Fire Protection Association (NFPA). Another standard is Underwriters Laboratory Standard UL 1046 entitled Standard For Safety-Grease Filters for Exahust Ducts. Publications containing these standards set forth requirements, test conditions, and otherwise deal with the problem referred to herein. Whether or not a given installation complies with these safety codes may determine whether the installation is approved by local boards and authorities, and whether or not this is the case, insurance rates are also affected by the ability of a kitchen-based grease and smoke collection system to comply with these codes.

Up until now, the most generally accepted system of dealing with the problem of filtering grease particles from the air and collecting them involves the provision of a metal mesh or other filter material in a suitable frame. Typically, for commercial installations, the mesh is made from metal of the coarse steel wool type or, more commonly, from an expanded metal material which is placed in a predetermined pattern providing a number of thicknesses of such material, with the material then being given a desired surface texture and encased in a rectangular frame unit for insertion in a filter holder.

With filters of this kind, it is generally hoped that the grease particles in aerosol form, which are entrained in the exhaust air, will impinge upon and collect on the filter medium while the interstices will permit clean air to pass therethrough. In actual practice, however, this is often not the case and the filters of this kind usually vary greatly in efficiency of collection approaching good efficiency only when they are relatively full and approaching a clogged condition. Thus, as they accumulate grease and dirt of all kinds in use, they range between a condition wherein there is little pressure drop thereacross, but the filtering action is not particularly satisfactory, to a condition wherein the filtering action is satisfactory but the pressure drop is so high that the ability of the exhaust fans or blowers to continue to draw air through the system is taxed. This raises the possibility that there will be either inefficient scavenging of the air in the kitchen, or that the fan motors and other mechanical parts of the system will be overloaded.

By "efficiency" as referred to herein is meant generally the relative retention and collection of grease in the airstream in relation to the proportion of grease or other solid or solidifiable particles passing through the filter. The principal difficulty with inefficient systems passing measurable amounts of grease and oil containing aerosols past the filter is that these particles, as they pass into the lower temperature portions of the system, collect on the duct and fan surfaces. Undue accumulation of such particles creates fire hazards, undesirable odors and creates undesirably expensive maintenance conditions.

In the use of such prior art systems, including those using the steel mesh type of filter, when the filter becomes relatively clogged, it is necessary to attempt to clean it or dispose of it. Removing and cleaning relatively permanent filters such as those having a steel mesh is a difficult and time consuming job which is of questionable economic benefit. The reason for this is that, with the passage of time, materials entrained in the airstream, which are originally saturated and unsaturated oils, water, and the like, become oxidized and/or polymerized, particularly while on the surface of the filter mesh material. In the presence of high temperatures these materials adhere strongly to the filter substrate, and become difficult or impossible to remove without the application of chemicals which are not available to the restaurant owner, which are enviornmentally undesirable, unsafe or unduly expensive when applied by or dealt with by professional cleaning agencies.

While the mesh type of filter is virtually a standard in the industry, presently comprising some seventy to eighty-five percent of all hood and duct systems, other systems are also known, including the so-called baffle or impactor type system. In these units, an attempt is made to direct the air through a labyrinth or other sinuous path with the hope of slowing down the airstream or creating turbulence which would impede the downstream propogation of fire and also assist in the retention and collection of grease particles. However, baffle systems of the type which have proved effective to achieve worthwhile separation have generally been characterized by extremely high pressure drops. Consequently, the applications in which such baffles may be successfully used are severely limited in view of the capability of the exhaust system to collect and remove air from the cooking area in reasonable volumes at such costs.

In view of the shortcomings of the prior art grease collection and separation systems, it has been desired to provide an improved filter assembly for range and like hoods, and for use in kitchens and other applications.

As a consequence of the inability of or difficulty with cleaning existing filter systems, it was impractical for restaurant owners to clean the mesh type filters which they own. By the same token, for safety and other reasons, more economical filters, such as those made from fiberglass or the like, were not satisfactory or created other problems in use. The construction and arrangement of mesh type filters of the permanent kind, as pointed out, were still impractical from the standpoint of being serviced by outside cleaning agencies.

Because of the limited acceptance of the baffle system, it was likewise not practical to develop a broad based collection and cleaning and replacement systems for these units. In other words, whereas certain of the baffle systems in existence might have components which are able to be cleaned and replaced, the systems were not widely enough accepted to form the basis for an outside business based solely on removing and replacing these baffles with previously cleaned units.

In this connection, there is a significant demand and a much larger potential demand, for, a separate or outside service which would be concerned with maintaining hood and duct systems. The reasons favoring the existence and expansion of such outside businesses is that restaurant owners know from experience that employees are reluctant to perform the difficult and dirty work involved in cleaning the filters. Furthermore, removing the filter causes interruption of the cooking operation and is often delegated to the least skilled laborer who, in turn, may lack the knowledge, enthusiam and desire to accomplish the job thoroughly and effectively.

Another problem with prior art baffle systems is that their operating characteristics vary considerably with their size and arrangement. As a consequence, the baffle installations resisted the standarization which would be necessary to large scale standardized maintenance of these parts. In other words, the basing a hood and duct cleaning service on the existence of such system would require an inordinately high number of parts to be kept in stock, with the result that economies of scale in the production of such units could not be achieved.

Moreover, the baffle systems of the known type were of such size and complexity as not to be readily cleanable, and furthermore, were of such size as not to be readily disposable in view of their costs.

Referring again to baffle systems generally, many of such baffle systems have suffered from another drawback, namely, that while they provide good performance as a flame arrester, their efficiency was relatively low and as a consequence, they were generally ineffective as filters and created and aggravated the problems referred to above of undue buildup of grease and oil and other flammable materials in the collecter system.

In view of the failure of the prior art to provide a grease filter system for a restaurant application or the like which provided sufficiently low pressure drop, sufficiently high efficiency, satisfactory compliance with fire and other applicable codes, and was economical enough to be thrown away or disposed of, it is an object of the present invention to provide an improved restaurant grease filter for use in kitchen hoods.

It is another object of the invention is to provide a baffle type unit for incorporation into a range hood which is capable of acting effectively as a filter and which is very economical to produce.

Another object of the invention is provide a hood filter which is capable of being made in a relatively small number of sizes and which is applicable to a very large number of installations.

A still further object of the invention is to provide a grease filter which is a very thin cross section in relation to known prior art filters.

An even further object of the invention is to provide a filter unit which is capable of manufacture at extremely low cost and to be made from fully recyclable materials.

Another object of the invention is to provide a grease filter unit which is capable of removal and replacement in a very short time and which may therefore be serviced on a contract basis at low cost to the restaurant owner.

A still further object of the invention is to provide a grease filter unit in which the level of contamination may be readily discerned by observation and which may be changed as required.

An even further object is to provide a grease filter which is capable of complying with relatively stringent existing requirements concerning flame propogation and which will comply with existing fire prevention and related codes.

A still further object is to provide a filter which is capable of being used in a wide number of applications without altering existing filter support framework structures.

Yet another object of the invention is to provide a filter device having a pattern which makes it easy to manufacture by known techniques.

Yet a still further object is to provide a grease filter unit which is capable of incorporation into existing hoods, and which in use be positioned in various orientations including vertical, inclined or nearly horizontal applications with comparatively equal performance in use.

A still further object of the invention is to provide a filter of the impactor type which presents plural forwardly directed surfaces for receiving grease particles transported by the airstream as they strike the surfaces, spaced apart surfaces on the downstream portion of the unit, and a series of indented panels and cut outs serving to permit grease to flow from the impact area to a collection area.

Another object of the invention is to provide a filter unit which is free from mesh or other filter media of the prior art, which achieves its collection and separation action entirely through the provision of a labyrinth design.

Still another object of the invention is to provide a filter unit which provides contoured surfaces particularly adapted to facilitate the collection and removal of grease particles from the surface of the filter prior to the time they agglomerate into solid or semi-solid form.

A still further object of the invention is to provide a filter unit having impaction surfaces and other features of surface development which promote drainage of liquid materials thereon to remote reservoirs or collection stations.

Yet another object of the invention is to provide a filter having exposed surfaces adapted for minimum buildup of accumulated grease thereon, thereby reducing to a practical minimum the amount of grease available to provide a potential fire hazard and/or to add fuel to a fire having its origin elsewhere in the vicinity of the filter.

A further object of the invention is to provide a filter which has its upstream and downstream surfaces separated by a greatly reduced depth in relation to prior art filters preferably a depth not more than ¾ to ⅝ of an inch, making storage, shipping, and particularly storage and shipping by a service related organization much more economical.

An even further object of the invention is to provide a filter unit which is of extremely lightweight, thin material so as to be economical, and yet which is capable of receiving removable weights or other units facilitating firmly holding the unit in place.

A still further object of the invention is to provide a filter having means for receiving bars, rods or the like for holding it in position against rattling, chattering, noise-making, or displacement by the addition of mass, and at the same time protecting these bars or the like from the accumulation of grease or dirt so that they may be readily removed from an existing unit and inserted in place to a replacement unit without requiring intricate maneuvers, skilled labor or the like.

Another object of the invention is to provide a filter which will receive weight forming members and in which the member added to lend weight to the filter assembly is also adapted to impart rigidity thereto and hence reduce deflection of the unit under load.

A further object of the invention is to provide a filter unit having opposed front and rear contoured surfaces offset from each other and having edges extending toward each other in spaced apart relation to provide a labyrinth, and further including depressed panels or center sections on the faces presented to the airstream to facilitate collection and ultimate discharge of grease therefrom.

It is also an object of the invention to provide replaceable, easily cleanable combination filters and flame arresters which are constructed and arranged so that a minimum number of separate units or "part numbers" is required to service a large variety of sizes and shapes of hood and duct installations.

A still further object of the invention is to provide a combination baffle type filter and flame arrester type unit having drain paths for the accumulated waste material arranged so that the filter can be installed in either a horizontal or vertical position without loss of effectiveness.

An even further object of the invention is to provide a baffle filter/flame arrester which is adapted for ready engagement and removal by simplified servicing apparatus.

Yet another object of the invention is to provide a baffle and filter construction having a plurality of panels constructed and arranged so as to impart a combination of sufficient stiffness, light weight, and freedom from potential grease drain path blockage which have characterized certain other known systems.

Another object is to provide a filter/flame arrester, which, when subject to heat and strong drafts, will deflect under such load in a manner adapted to decrease rather than increase flame propogation.

A still further object of the invention is to provide a filter/flame arrester which will confine flame propogation to a relatively limited area downstream of the filter, making it possible to treat the downstream area by known methods to reduce the likelihood of continued combustion downstream of the filter; that is, to make an arrangement which will confine the flames to a certain region of the hood or duct, and thus enable a pre-determined portion of the hood and duct to be treated with flame retarding or arresting chemicals known to be useful for this purpose.

Another object is to provide a filter/flame arrester construction which, while capable of greatly improved performance when tested according to a particular, existing standard, also provides good performance when subjected to other conditions of use.

The foregoing and other objects and advantages of the invention are achieved in practice by providing a baffle type filter having upstream and downstream face elements, with the upstream element being subdivided into a plurality of contoured panels spaced apart from each other to define plural air inlet areas, with each panel including an outer marginal surface, tapered offsetting surfaces, and a flat central impactor panel offset from the plane of the surrounding marginal surfaces, with the downstream elements also including contoured panels having outer, generally planar margins, inner offset surfaces and offsetting surfaces extending between the margins and the offset surfaces, with the downstream panels being likewise spaced apart from each other to define plural air outlet areas, with the front and rear panel assemblies being arranged in staggered relation to each other to provide a labyrinthine flow path for grease-laden exhaust air, and with each panel further including a plurality of drain openings formed at the junction of the impactor surfaces and the offsetting surfaces, with each of the panels also including, at its lower portion, means defining drain paths for accumulated grease and the like, with each of the drain path defining means extending between the openings and the impact surfaces, with the assembly further preferably including a plurality of end wall portions defining pockets for receiving rods or bars for adding weight and stiffness to the unit and to aid in positioning it in use.

The objects and advantages are also achieved by a simple two-piece construction of filter which minimizes cost and makes assembly simple and straightforward.

The exact manner in which the invention achieves the foregoing and other of its inherent objects and advantages will become more apparent when reference is made to the following detailed description of the preferred embodiments of the invention set forth by way of example, and to the accompanying drawings, wherein like reference numbers indicate corresponding parts throughout the several figures.

BRIEF DESCRIPTION OF THE DRAWINGS

FIG. 1 is a vertical sectional view, partly schematic in character, and showing the relation of a hood and duct assembly to the novel baffle type filter and flame arrester units of the invention;

FIG. 2 is a front elevational view of one form of combination baffle filter and flame arrester made according to the invention;

FIG. 3 is a fragmentary rear elevational view, showing the filter and flame arrester of FIG. 2;

FIG. 4 is an enlarged fragmentary bottom view of a portion of the filter/flame arrester unit of the invention, taken along lines 4—4 of FIG. 2;

FIG. 5 is a further enlarged fragmentary horizontal sectional view of a portion of a filter/flame arrester of FIG. 2, taken along lines 5—5 thereof;

FIG. 6 is a fragmentary vertical sectional view of a portion of the filter/flame arrester of FIG. 2, taken along lines 6—6 thereof;

FIG. 7 is a fragmentary enlarged plan view of a portion of the unit of FIG. 2, taken along lines 7—7 thereof;

FIG. 8 is a further enlarged fragmentary view of a portion of the apparatus of FIG. 2, taken along lines 8—8;

FIG. 9 is a front elevational view of a modified form of baffler filter/flame arrester made according to the invention and adapted to drain accumulated grease and the like, regardless of its orientation in use;

FIGS. 10 and 11 are schematic illustrations of the advantages derived from using filters having diagonal panels;

FIG. 12 is a front elevational view, with portions broken away, showing a modified, vented panel filter unit made according to the invention; and FIG. 13 is a fragmentary horizontal sectional view similar to that of FIG. 5, and showing certain constructional features of the unit of the modified construction of FIG. 12.

DESCRIPTION OF THE PREFERRED EMBODIMENTS OF THE INVENTION

While the combination baffle type filter and flame arrester of the invention is capable of different applications, and can be used in a variety of installed positions, a description of a preferred form thereof will be made wherein the unit is installed as a replacement for an existing mesh filter unit in a hood of conventional construction, that is, with the unit received in a pair of oppositely directed channels facing each other and defining therebetween an imaginery inclined plane surface which is directed in generally facing relation to the area above a kitchen range and/or deep fat fryer.

Referring to the drawings in greater detail, FIG. 1 shows a vertical sectional view of a hood and duct apparatus generally designated 20 and shown to include upper and lower frame members 22, 24 which support portions of a range hood 26 having portions thereof attached to sidewalls 28, partially defining a duct 30 in which a fan assembly 32 is positioned and adapted to draw air and its associated or entrained contents in the direction shown by the arrows.

Forming the upper and lower edges of the hood 26 respectively are a pair of oppositely directed, upper and lower channels 34, 36 which provide openings 38, 40 of enlarged width to positionably receive the filter and baffle assembly 42. FIGS. 2, 5 and 6 show that the filter assembly 42 includes an upstream or front face element generally designated 44 in FIGS. 5 and 6, and a downstream or rear face element generally designated 46, in these same figures. As shown in FIG. 2, the upstream element 44 includes top and bottom marginal surfaces 48, 50 and left and right hand side marginal surfaces 52, 54, serving to define the outer front face margins of the element 44, with the element being further defined by spaced apart, individual vertically extending front surface panels 56a, 56,b, . . . 56j. A more detailed description of each of these panels appears elsewhere herein.

FIGS. 3, 5 and 6 show that the rear or downstream element 46 of the filter assembly likewise includes an outer rear face margin defined by an upper or top margin 58 and left and right hand marginal panels 60, 62 and a lower or bottom margin 64 (FIG. 8).

The rear or downstream element also includes a plurality of contoured, spaced apart panels 66a, 66b, . . . 66i, the construction of which is referred to elsewhere herein.

FIG. 5 shows that a representative end, such as the right hand end of the assembly 42 includes outer and inner sidewalls 68, 70 formed respectively from the end portions of the outermost margins 54, 60 on the front and rear elements 44, 46, and that flanges 72, 74 extending inwardly from the panels 54, 60 define a pocket 76 for receiving a bar 78 which serves to stiffen and add weight to the ends of the unit 42. The left hand side (not shown) of the unit 42, shown in detail in FIG. 5, is a mirror image of, but otherwise identical to, its counterpart on the right hand side.

Referring again to FIG. 5, a typical panel 56i is shown to comprise a left and right hand planar marginal surface 80, 82, left and right hand inclined offsetting surfaces 84, 86, and an offset, central impactor panel 88. Upper and lower offsetting surfaces 90 (FIG. 6) and 92 (FIG. 5) are also provided so that the offset or depressed central impactor panel 88 is joined by offsetting surfaces on all of its four sides.

Each panel 56i, etc., when viewed vertically, is also defined in part by left and right hand flanges 91, 93 which extend inwardly at right angles from the respective adjacent outer marginal surfaces 80, 82 toward the interior of the unit. Thus, each individual panel, such as the panel 56i, is substantially identical to its counterpart, and may be thought of as having a channel-shaped cross-section with an offset central panel. The outer or end panels 56a and 56j are identical, except that, for purposes of convenience, the outer offsetting surface 86j extends perpendicular to the offset channel 88j instead of being disposed at a 45° angle thereto.

Referring now to the construction of the rear or downstream element, in addition to the marginal panels referred to above, the unit includes a plurality of substantially identical individual panels, such as the panels 66h and 66i shown in FIG. 5. Each such panel is likewise generally channel-shaped with an offset central panel, and includes outer flanges 94, 96 extending respectively from flat panels 98, 100, which in turn are attached to inclined offsetting side panels 102, 104 joined at their respective inner edges to a central offset impactor panel 106. These side panels, plus a bottom offsetting panel 107 and a top offsetting panel 109 (FIG. 3) comprise the four offsetting, inclined panels extending between the respective planes in which the panels 58, 64, 98 and 100 and the panel 106 are disposed.

Referring now to the arrangement of a typical upstream or front element panel 56i and its associated downstream or rear panels 66h, 66i, it will be noted that these sets of panels are offset laterally from each other so as to create a labyrinth or obstruction to direct, front-to-rear air flow through the unit. Furthermore, the free edges of the flanges 91, 93 extend downstream but inwardly (to the rear) of the filter body, while the free edges of the oppositely disposed panels 94, 96 extend inwardly of the body, but forwardly or upstream in relation to the air stream.

A plurality of air inlets, such as the inlets 108 (FIG. 5) are defined by the spaces between the adjacent front surface panels 56i, 56j, while a pair of outlet or exhaust passages 110 are provided between adjacent rear surface panels 66h, 66i. Consequently, air attempting to flow directly from front to rear would enter the inlet 108, for example, and then be directed to and impact upon the area 106 and its surrounding regions, finally being discharged from the filter body through one of the outlet or exhaust passages 110. Air not directly entering a passage 108 would impact one or more front facts of one of the panels 56, with the center panel 88, for example, presenting the largest surface area.

Referring now to other detailed constructional features of the filter assembly 42, FIGS. 6 and 7, for example, illustrate that there are also top and bottom sidewalls, such as the walls 120, 122 formed as bent-over portions respectively of the marginal surfaces 48, 58 defining an upper portion of assembly 42 (FIG. 6), and that counterpart surfaces (FIG. 8) 124, 126 are provided at the bottom as extensions of the lower margins 50, 64. In each case, joints such as the joints 128, 130 are provided by an offsetting/interlocking operation of a type well known to those skilled in the art of sheet metal assembly. FIG. 7 also shows such a joint, together with a plan view of the stiffening and locating bar 78 which is also shown in FIG. 5.

Referring now to FIG. 2, another feature which is preferably, but need not necessarily be incorporated into the filter/arrester asssembly 42 of the invention, is shown to be provided, tool end-receiving apertures or fixtures 132, 134. As shown in FIG. 6, the unit 134 includes an upper, tapered boss section 136, and a lower tapered section 138 having respective lower and upper edges 140, 142 which are spaced apart so as to provide an opening 144 to receive the end of a tool which is used to engage and raise the filters for removal from the lower channel 36 (FIG. 1) and subsequent cleaning and/or disposal.

Another feature of importance to the present invention is the system for collection and drainage for the accumulated material. In this connection, the embodiments shown in FIGS. 1–8 include a plurality of drain arrangements generally designated 146 at the bottom of each of the panels 56a, 56b, etc. These arrangements include channels 148 and drain openings 150, certain details of which can also be seen in FIG. 8. Thus, FIG. 8 shows one of the tapered walls 152, and a back wall 154, which combine to comprise a recessed drain 148 terminating in the opening 150 at the bottom, such opening being defined by an arcuate wall 156, formed in the lower panel margin 50 and an arcuate wall 158 in the double thickness bottom wall 124, 126. The drain path wall 154 (FIG. 8) is coplanar with the recessed surface 88, and consequently, accumulated water, oil and grease draining down the recessed face of the panel will pass through the openings in the bottom thereof into the collection system, such as that provided by the channel 36.

Inasmuch as the openings 150 communicate with the lower, interior region generally designated 160 in FIG. 8, water, oil, etc. collecting in the interior of the unit will also drain outwardly through these passages or openings. Material also accumulates in the area 160 as a result of downward drainage from the inwardly directed surfaces of the panels 94–106, all of which face toward the inside of the filter/baffle assembly 42 and serve to collect water, oil and grease impinging thereon, as such material passes through the inlet air passage 108, for example. Inasmuch as the unit 42 is intended to be positioned as shown in FIG. 1, all of the material collected will drain towards the bottom and front of the unit, and only one set of drain openings need be provided. If the unit is to be positioned in a vertical or near vertical plane, a different arrangement of drain openings may be indicated.

Referring now to an emobidment of the invention which is preferred for many applications, FIG. 9 shows the front portion only of a baffle filter/flame arrester assembly adapted to be used interchangeably in several applications. This unit includes the same upper, side and lower marginal panels 248, 250, 252 and 254 and in other respects is the same as its counterparts in FIGS. 2–8, except that the upstream or front face panels 256a, 256b, ... 256g are inclined at a 45° angle with respect to the margins 248, 250, etc. Each panel includes drain openings 350 which communicate through channels 348 to the end portions of their respectively associated panels 256a, 256b, etc. Inasmuch as the arrangement of FIG. 9 permits the panel to develop a vertical draining component when installed as shown, or when installed in a position which is rotated 90° with respect to such position, drain openings 350 and channels 348 are provided at both ends of the recessed sections 188.

Because the units of FIG. 9 are adapted to operate either vertically or horizontally, and because the lower end of each panel does not lie along a horizontal surface, a modified form of drain opening is provided, including openings 211 lying at the lower corners of certin of the offset panels. Other forms of drain paths not shown in detail would also be suitable as long as they provide communication between the recessed panels and the interior of the filter.

While the rear or downstream face of such panels is not shown, it will be understood that a plurality of panels 266 are disposed in staggered or offset relation to the panels 256 so that a labyrithine air flow pattern is established in the embodiment of FIG. 9 in the same way as it is established in the embodiments having vertically disposed front and rear panels. Thus, except for the angle at which the panels are disposed, and the arrangement of the drain ports, the construction of the front and rear panels is the same as that of their counterparts; the arrangements for reception of stiffening rods or bars, etc. is also the same.

In use, the baffle filter/flame arrester units of the invention have shown dramatically improved performance. Rated as filters, the units are able to separate a very large percentage of airborne impurities from the air stream, minimizing build-up of greasy deposits on the downstream portions of the hood and duct assembly. This decreases fire hazards and cleaning and servicing costs. Most importantly, however, the units of the invention, which present a much thinner cross-section from front to rear, namely from about one inch down to about three-quarters of an inch or even less, when subjected to laboratory tests, such as the test known as UL No. 1046, display exceptionally limited flame projection.

The principal criteria by which grease filters are evaluated involves (1) their efficiency, that is their ability to remove grease from grease-laden air; (2) their ability to drain away the grease which collects on them without permitting it to fall back on the cooking surface; and (3) their ability to limit flame projection downstream when the upstream face is attacked by flames. In these tests, an outline of the conditions of which appears in UL publication No. 1046, dated July 30, 1979, the filter/flame arrester proved highly satisfactory and was given a "UL" approval. The standard test calls for a filter to be loaded with grease generated in a standard manner until a certain amount has accumulated. Thereupon, a standard gas flame is ignited, and the face of the filter is exposed to this flame, with a draft being drawn on the duct so as to achieve an air flow through the filter of 200 feet per minute (3.33 feet per second). Under these conditions, a flame spread or propogation of 18", but no more, is permissible. Filters permitting further flame propogation are not approved, while those demonstrating less propogation are able to pass this test. When subjected to this test, filters made according to the invention and corresponding to those illustrated in FIGS. 1–8 herein averaged 7" to 13" flame propogation, with a maximum flame propogation of 15", easily complying with the test requirements.

The ability of baffle filter/flame arresters made according to the invention to perform favorably in tests conducted according to Underwriters' Laboratory Standard No. 1046 permits the units to be accepted under Section 4 of NFPA Standard 96. Consequently, the premises on which the units are installed can obtain the most favorable fire rating possible, and obtain concomitantly favorable insurance rates.

Another favorable aspect of the filter/arresters of the invention is that, because flame propogation is limited, additional protection can be gained by treating the area immediately downstream of the filters with flame retardant agents. Thus, where the degree of flame propogation can be established by tests, and where the extent of propogation is relatively limited, such as the 15" or less obtainable in the UL test, it is practical to treat the exposed interior hood and duct surfaces with a flame retardant composition in a limited area, such as an area extending perhaps only two feet or so downstream of the filter location.

Typically, such treatment materials include a composition which is largely sodium bicarbonate ($NaHCO_3$), with a small amount of silica gel or the like to prevent caking, and a pigment such as titanium dioxide ($TiO_2$) being mixed therewith. Such composition, when applied moist, will adhere to the substrate and be highly visible because of the oxide pigment. When this composition becomes impregnated with grease, the potential fire hazard is reduced, because at or near ignition temperature, the bicarbonate material decomposes to release carbon dioxide ($CO_2$), helping retard ignition of the grease. While such composition will not eliminate grease fires per se, tests have shown that, under certain conditions, a treated area containing the same amount of grease as an otherwise untreated area, when exposed to the Underwriters' test, ignites more slowly, if at all, than the untreated area. Because of the very limited flame propagation permitted by the filter of the invention, the area requiring treatment is reduced in respect to the counterpart area if a mesh filter is used.

In this connection, tests under at least one set of circumstances have shown that where a duct which has both chemically treated and untreated areas is filled with grease, the grease laden areas downstream of the chemically protected area will not be ignited when the baffle filters of the invention are used, but will ignite where there is a fire on a conventional mesh filter. While such duct fire might be prevented using a mesh filter and treating a larger duct area, the fact that a reduced area requires treatment to obtain the same degree of protection is another indication of the advantages of the filter/arrester of the invention.

Referring now to another favorable aspect of the invention, the filters, although strong enough to perform satisfactorily in the foregoing tests, and rigid enough to be able to be installed without difficulty, are able to be made of very light weight material. For example, when made from a Type 1100 aluminum in a thickness of 0.012", the units are satisfactorily rigid, but in a 19.5" by 19.5" size, weigh only about one pound, exclusive of the bar while a thickness of 0.012" is preferred, satisfactory results are obtained using aluminum in thickness of from about 0.020" and down, the minimum being a thickness sufficient to permit the filter to withstand handling and suction draft in use. Consequently, it is economically practical for the premises operator to discard the filters after use. The advantage of this arrangement is that a service organization can easily remove the filters without fear of damaging them, and collect and return them to a recycling point at which they may be recycled.

Thus, being made from aluminum, the scrap value of which is relatively high, is both a fabricating and a disposal advantage. Whereas prior art filters were generally too expensive to throw away, but were difficult or impossible to clean on the site, filters according to the invention can be priced attractively because of their recycling potential. The ability to be recycled also means that the cleaning process can be conducted at the same time that recycling takes place. Prior art filters requiring cleaning, if sufficiently strong to withstand harsh treatment, were unduly heavy, and if light weight for economy, were often not sufficiently strong to be cleaned and repeatedly returned to service.

In the latter connection, the provision of the tube or other enclosure for receiving and positioning a stiffening, weight-imparting bar or rod may be appreciated. In use, the route man or other person desiring to service an installation removes the existing filters from the range hood, and then merely inverts the grease-laden filters, permitting the bar, such as the bar 78 in FIGS. 5 and 7, to slide out from the pocket 76. Because of their enclosed position, the bars remain relatively clean, and are merely inserted in the new filter assembly. The new replacement assembly is thus reinserted, and the weight added by the bar positions it in the hood channels in such a way as to lie securely in position, therein, with the weight and stiffening provided by the bars 78 insuring that the air stream does not displace the filter from its position of use.

In this connection, reference is again made to FIG. 1, where it is shown that a filter positioner 99 is received in the slot 40 provided by the channel 36. The positioner 99 holds the filter in spaced apart relation from the bottom of the channel. In this manner, as is known to those skilled in the art, the channel 36 serves as a collector for the grease, which accumulates elsewhere. In some cases, these troughs or channels may be similar to those shown in U.S. Pat. No. 3,870,490, for example.

The positioner 99 engages one or more of the bosses 199 (see also FIGS. 2 and 4) which extend downwardly from the bottom surfaces 124, 126 of the unit 42. These bosses 199 insure that the filter does not lie flat against a portion of the trough or channel in which it rests and thus prevent grease from draining therebeneath.

In some cases, the channel may be inclined from left to right, perforated and arranged above a collector, or otherwise suitably positioned in a manner known to those skilled in the art. The provisions of the spaced apart drain openings in the front and rear, lower corners of the unit of the invention renders the filter unit compatible with existing grease drainage and collection systems.

Referring now to the construction of the filter/arrester unit having depressed or offset central panels, it will be appreciated that this arrangement insures that there are areas for collection and drainage of grease, which recessed areas will not be blocked by engagement with neighboring flat surfaces on the hood frame, collection channels, etc. Still further, the provision of these panels stiffens the unit by increasing its section modulus, thus enabling, for example, the units to be made from sheets of a type 1100 aluminum alloy, as little as 0.012" thick.

In addition to providing requisite strength and light weight, the filter unit of the invention has another advantage in use. During the tests just referred to, namely, those involving air velocities of 200 feet per minute, when the upstream face is exposed to flames, this face normally develops a higher temperature than the downstream face. The upstream face deflects more under load than the downstream face, particularly in a heat-weakened condition, causing the front and rear faces to lie closer to each other. This, in turn, reduces air flow and further diminishes flame propogation.

Thus, while the filter unit does not undergo structural failure, as it deflects under load without failing, and tends to assume a position which reduces flame propogation and consequent fire hazards in the duct. While drafts used in the standard tests are probably significantly higher than those actually encountered in actual restaurant use, the partial collapse of the filter would still act as a safety factor in most cases, by reducing the effective air flow across the filter and downstream thereof.

Accordingly, while the reasons for the success of the filter flame arrester unit are not known with certainty, it is believed that the closely spaced apart front and rear baffles are able to present enough surface area, and impart enough instantaneous velocity changes in the air stream to cause the unit to act as an effective filter. This arrangement provides greatly reduced pressure drop in relation to thicker baffle units, particularly those wherein in relation to the axis of air flow, the trailing of downstream edges of the upstream panel lay downstream or leading edges of the downstream panel. According to the present invention, a preferred form of a filter has flanges such as the flanges 93 and 96 in FIG. 4 which extend about 3/16" or ¼" downstream and their counterparts the same distance upstream in a unit having an overall width of ⅞". Thus, there is a flange-free central area of ⅜" to ½, measured axially of the overall air flow direction between respective facing edges of the flanges. Consequently, while air flow through the filter requires directional changes, the labyrinth is not so convoluted as to require the air to flow both downstream and upstream within the filter body. Similarly, there are no partitions within the filter itself, so that the filter may be thought of as a single plenum with a number of inlets and outlets free of partitions between adjacent areas or compartments.

Tests have indicated that, particularly in contrast to mesh units, the filter of the invention is extremely efficient, in a typical instance, causing actual overflow of a grease return reservoir used in other tests. In other words, where the filter is attempted to be loaded with a certain amount of grease, a vessel for collecting returned grease is provided for measurement. The filter of the invention returned so much more grease than was anticipated, that this vessel was filled to overflow and a substantial amount of additional grease was collected. From this standpoint alone, namely, the retention of minimal amounts of grease, and return of more grease to the collection system, the real-life fire potential is significantly diminished.

Referring now to FIGS. 10 and 11, a schematic illustration is shown of a pair of filter units 442, 542 of generally rectangular configuration, the left hand unit of which is shown to include top and bottom marginal surfaces 448, 450, and left and right hand marginal surfaces 452, 454. As shown, the filter element 442 is rectangular, rather than square, and has a height of "A" and width "B". On the left hand side of FIG. 10, there are shown a plurality of vertically extending panels 456a, 456b, etc. On the right hand side are a plurality of diagonally extending panels 499a, 499b, etc. FIG. 11 shows a filter having the same dimensions "A" and "B" as that of FIG. 10. For purposes of illustration, however, it will be assumed that the filter of FIG. 11 is intended to be received in an opening having a long vertical dimension rather than a long horizontal dimension.

Accordingly, a filter for this application would have vertical panels 556a, 556b, etc., because the panels must be at least partially aligned with the intended drain path, which is determined by gravity. If the filter of FIG. 10 were merely placed on end in an opening intended for a filter of the type shown in FIG. 11, the panels 456a, 456b would extend horizontally and the filter would not function. According to FIG. 11, however, diagonal panels 599a, 599b, etc. may be provided. In all functional respects, these panels are the same as their counterparts in FIG. 9.

From a consideration of FIGS. 10 and 11, the advantages of diagonal panels may be appreciated. In other words, if panels extending parallel to dimension A were provided, the filter of FIG. 10 would not work in the application of FIG. 11, and vice versa. Therefore, using filters having panels extending parallel to the "A" and "B" dimensions as shown on the left hand sides in FIGS. 10 and 11 would require making and stocking two different parts for an opening having identical dimensions "A" and "B". Where a diagonal unit is provided, therefore, fewer part numbers are required to be maintained in stock.

Viewed from another standpoint, the diagonal panel construction eliminates the likelihood that service personnel might inadvertently assemble the filter in a position which is inoperative with respect to grease drainage. While all the advantages of part number reduction are not necessarily achieved with a square or virtually square construction, such as that shown in FIG. 9, the filter is there illustrated in detail so the arrangement of its parts may be clearly understood.

Referring now to another embodiment of the invention, it has been found that it is possible to provide a baffle filter/flame arrester similar to that shown in FIGS. 1-8, and having the principal features thereof, but also including auxiliary vents or louvers in the transition or offsetting surfaces lying between the recessed or offset panel section and the portions of the panels lying coplanar with the outer margins of the filter.

Thus, referring to FIGS. 12 and 13, certain detailed features of construction are shown to be provided. In FIG. 12, a filter unit generally designated 642 is shown to be provided and to include a plurality of panels 656a, 656b, etc. which are offset inwardly or downstream of the outer panel margins which are coplanar, for example, with the left hand and upper marginal surfaces 652, 648. The louvers or vents, generally designated 609 in FIG. 12, are shown in detail in FIG. 13, which, except for the construction of the upstream panels, closely resembles FIG. 5.

In FIG. 13, a typical upstream panel 656i is shown to comprise left and right hand planar marginal surfaces 680, 682, left and right hand side inclined offsetting surfaces 684, 686, and an offset central impactor panel 688. Except as described below, the remaining surfaces of the unit 642 illustrated in FIGS. 12 and 13 are the same as their counterparts in FIGS. 1-8. FIG. 13 shows that louvers or vents 609 comprise a left hand side, inwardly extending, angular panel 619, shown in section and in cooperation with the inner end of the panel 680, define an open vent or louver generally designated 629. In addition, the panel 656i also includes a right hand side louver 609, providing an opening 639 similar to the opening 629 and defined in part by the flange 649.

As shown in FIG. 12 when the filter is in the position of use with the panels 656a, 656b, . . . 656i extending vertically, the axial louvers or vents 609 are in alternating or staggered vertical relation, with perhaps five to eight each being provided in a filter which is about 24" high. Accordingly, in FIG. 13, the flange 619 is shown in section, and the flange 649 in elevation, it being understood that they are offset vertically from each other.

The cross sectional area of the openings 629, 639 is quite small in relation to the openings 708 between the panels 656h, 656i, etc. In other respects, including the construction of the downstream panels, the stiffening bars, the panel dimensions, etc., the filter of FIG. 13 is the same as its earlier described counterparts.

While a construction has been described wherein two weight-adding and stiffening bars are used has been described and whereas it is not preferred to add additional weight and stiffness to the unit by disposing a horizontal bar at the bottom of the unit, in view of its possible interference with grease drainage, it is possible, and in some cases desirable, to add a third bar to the unit for weight-adding and stiffening purposes. In this case, the bar is preferably placed horizontally in the upper portion of the filter, that is, between the front and rear faces of the top filter body margin.

According to the invention, it is believed that a greatly improved, highly practical, readily replaceable filter/arrester unit has been developed which is able to provide greatly improved performance in standard tests, is easily replaced and is economical enough to be discarded and/or recycled, even affording the basis for an independently operated filter removal and replacement service.

It will thus be seen that the present invention provides a novel grease filter/flame arrester having a number of advantages and characteristics including those pointed out above and others which are inherent in the invention. A preferred embodiment of the invention having been described by way of illustration, it is anticipated that changes and modifications of the described grease filter/flame arrester will occur to those skilled in the art and that such changes and modifications may be made without departing from the spirit of the invention or the scope of the appended claims.

We claim:

1. A combination range hood filter and flame arrester unit adapted for removable reception in an associated range hood, said unit including a body having upstream and downstream face elements, with said upstream face element being subdivided into generally planar, upper, lower and side surfaces combining to define the outer front face margins of said body, and a plurality of contoured front panels joined at their ends to at least two of said front face margin surfaces, said contoured front panels being also spaced apart from each other to define therebetween plural air inlet areas, with each contoured panel including an outer marginal surface, tapered offsetting surfaces, and a flat central impactor panel offset toward the interior of the said body from the plane of the surrounding marginal panel surfaces, with said downstream face element also including upper, lower and side surfaces defining the outer rear face margins of said body, and a plurality of contoured panels joined at their respective ends to at least two said rear face margin surfaces, said contoured rear panel also having outer, generally planar margins, inner offset surfaces lying inwardly of said body, and offsetting surfaces extending between said panel margins and said inner offset surfaces, with said rear panels being likewise spaced apart from each other so as to define therebetween plural air outlet areas, with said individual front and rear panels being arranged in staggered, partially overlapping relation to one another to provide a labyrinthine flow path for grease-laden exhaust air, and with each panel further including means defining a path for accumulated grease and the like to drain from the surfaces of said panels past at least said bottom face margin of said body to a collection area.

2. A combination unit as defined in claim 1 wherein said contoured front and rear panels are arranged with their outer marginal surfaces lying substantially coplanar respectively with said front and rear face margin surfaces.

3. A combination unit as defined in claim 1 wherein said contoured panels are arranged parallel to said side surfaces and perpendicular to said upper and lower surfaces defining said front and rear face margins of said body.

4. A filter assembly as defined in claim 1 wherein said contoured panels are arranged diagonally with respect to said front and rear face margins of said filter body.

5. A combination unit as defined in claim 1 whe said drain path defining means include surfaces which a offset inwardly of the plane of said front face marginal surfaces, so as to lie within said filter body.

6. A filter assembly as defined in claim 1 wherein said panels are arranged diagonally with respect to said front and rear body margin surfaces, and wherein at least some of said drain path defining means comprise drain openings formed in the lower portion of said offsetting surfaces in said contoured panel, said openings thereby permitting grease to flow from said offset surfaces of said contoured panels to the interior of said panel body.

7. A combination unit as defined in claim 1 wherein said body also includes outer sidewalls extending perpendicular to the plane of said front and rear face margin surfaces.

8. A filter assembly as defined in claim 1 wherein at least some of said contoured panels in said upstream face element further include a plurality of auxiliary vent openings, each of said vent openings being formed from portions of said offsetting surfaces, said auxiliary vent openings being spaced apart from each other in the direction in which said offsetting surfaces extends.

9. A filter assembly as defined in claim 1 wherein at least some of said contoured panels on said upstream face elements include auxiliary vents and air directing flanges, said air directing flanges extending inwardly of said filter body and at least partially downstream of said ce portion of said front face contoured panels, said flan being formed from material comprising said offsetting surfaces and being bent out of the planes therof to define said vent openings.

10. A combination unit as defined in claim 1 wherein at least one of said contoured panels includes a formation for receiving a combination unit removal tool, said formation comprising a boss located in one of said contoured panels, and a tool-receiving opening in said boss, said tool-receiving opening being directed generally perpendicular to the face of said contoured panel.

11. A combination unit as defined in claim 1 wherein the maximum thickness of said body measured parallel to the overall direction of air flow is about one inch or less.

12. A combination unit as defined in claim 1 wherein said upstream face element and said downstream face element are spaced apart from each other by about ¾ to about 1".

13. A combination unit as defined in claim 1 wherein said upstream and downstream face elements are made from aluminum sheet material having a thickness of not more than about 0.020".

14. A combination unit as defined in claim 1 which further includes a bottom sidewall surface extending between said front and rear face margins of said body, and wherein said means defining said drain path includes a plurality of openings formed at least partially in said bottom sidewall.

15. A combination unit as defined in claim 1 wherein said means defining said drain path includes a plurality of drain openings in said lower surface of said front face margin, and a plurality of inwardly offset drain channels, each of said channels extending between an edge of an associated drain opening and a portion of an associated impactor panel.

16. A combination unit as defined in claim 1 which further includes means defining at least one pocket for receiving and positioning a body stiffener and weight imparting element.

17. A combination unit as defined in claim 16 wherein said pocket is defined at least in part by one of said offsetting surfaces on one of said contoured panels, and at least partially by the portions of said body from which some of said front and rear face margins are formed.

18. A combination unit as defined in claim 16 which further includes at least one stiffener element disposed in said pocket.

19. A combination unit as defined in claim 16 wherein said at least one of said pockets comprise left and right hand side pockets, each including an associated stiffener unit in bar form, said bar having a cross section generally congruent with cross-section of said pocket, said bar extending just less than the entire length of said pocket and means defining an opening too permit insertion and removal of said bar from said pocket.

20. A disposable range hood filter and flame arrester unit comprising, in combination, a body having front and rear surfaces spaced apart from each other and connected to each other by outer body sidewall portions extending transversely of the planes of said front and rear surfaces, said body including a front face portion and a rear face portion with said front face portion including a plurality of front surface impactor panels spaced apart from each other to define air openings therebetween, with each impactor panel having a central offset panel portion extending inwardly of said body, said rear face portion also including a rear surface portion with a plurality of spaced apart rear surface impactor panels spaced apart from each other to define air outlet openings, with said front surface panels and said rear surface panels being arranged in staggered overlapping relation with one another so as to provide a labyrinthine air flow path therebetween, said rear surface panels also including central offset panels extending inwardly of said filter body, said filter body also including means defining at least one pocket for removably receiving a member for stiffening and imparting weight to said unit, whereby said unit may be inserted within associated hood and retained at least in part by the weight of said member, and whereby said unit may be economically removed and discarded after removal of said stiffening weight imparting member therefrom.

21. A filter and flame arrester as defined in claim 20 wherein said impactor panels on said front face portion further include auxiliary vent openings disposed therein, said openings being spaced from each other along the length of each of said impactor panels and being formed in the area of said panel lying between said central offset panel portion and the plane of said filter body front surface.

22. In combination, a range hood having a plurality of sidewalls with end portions defining a filter-receiving opening, means disposed on the inner surface of said hood sidewalls for receiving a combination flame arrester and filter unit for removing entrained grease and moisture from range exhaust air, and a flame arrester and filter unit received in said means within said opening and comprising, in combination, a body having upstream and downstream face elements spaced apart from each other and joined at their outer edges by outer sidewall surfaces, said upstream face element also including outer front face margins and a plurality of contoured front panels joined at their ends to at least two of said outer front face margins of said upstream element, said contoured front panels being also spaced apart from each other to define therebetween plural air inlet areas, with each contoured panel including a flat central impactor panel offset toward the interior of the filter body from the plane of the surrounding marginal surfaces of said panel, with said downstream face element also including a plurality of contoured rear panels joined at their respective ends to at least two of the rear face surfaces defining the outer margins of said downstream element, said contoured rear panels also having inner offset surfaces lying inwardly of said body, with said rear panels being likewise spaced apart from each other so as to define therebetween plural air outlet areas, with said individual front and rear panels being arranged in staggered, partially overlapping relation to one another to provide a labyrinthine flow path for grease-laden exhaust air, and with each contoured panel further including means defining a path for accumulated grease and the like to drain from the surfaces of said panels past the lower portions thereof to a grease collection area.

* * * * *

UNITED STATES PATENT AND TRADEMARK OFFICE
CERTIFICATE OF CORRECTION

PATENT NO. : 4,944,782
DATED : July 31, 1990
INVENTOR(S) : Rajendran et al.

It is certified that error appears in the above-identified patent and that said Letters Patent is hereby corrected as shown below:

On the title page:
In the ABSTRACT, line 4, please change "beteween" to -- between --.

In the ABSTRACT, line 13, please change "labyrinthne" to -- labyrinthine --.

In Claim 1, column 16, line 18, after "contoured" please insert the missing word -- rear --.

In Claim 1, column 16, line 19, after "two" please insert the missing word -- of --.

In Claim 1, column 16, line 20, please change "panel" to -- panels --.

In Claim 5, column 16, line 47, please change "whe" to -- wherein --.

In Claim 5, column 16, line 48, please change "a" to -- are --.

In Claim 9, column 17, line 8, please change "ce" to -- central -- and "flan" to -- flanges --.

Signed and Sealed this

Third Day of November, 1992

Attest:

DOUGLAS B. COMER

*Attesting Officer*     Acting Commissioner of Patents and Trademarks